United States Patent [19]

Büttgens et al.

[11] Patent Number: 4,717,509

[45] Date of Patent: Jan. 5, 1988

[54] REACTIVE FIRE-PROTECTIVE FORMULATION FOR RENDERING POLYURETHANE RIGID FOAM MATERIALS FLAME-RESISTANT AND PROCESS FOR PREPARING SAME

[75] Inventors: Walter Büttgens, Bad Honnef; Utto Kerscher, Erfstadt; Ernst Neukirchen, Cologne, all of Fed. Rep. of Germany

[73] Assignee: Chemische Fabrik Kalk, Cologne, Fed. Rep. of Germany

[21] Appl. No.: 34,745

[22] Filed: Apr. 6, 1987

[30] Foreign Application Priority Data

Apr. 7, 1986 [DE] Fed. Rep. of Germany ....... 3611566

[51] Int. Cl.$^4$ .............................................. C09K 21/00
[52] U.S. Cl. .................................... 252/609; 252/601; 521/107; 521/108; 521/904; 521/906; 525/41; 525/43; 525/450
[58] Field of Search ............... 252/601, 609, 182, 606; 521/137, 171, 174, 176, 106–108, 904, 906, 114, 123, 131; 525/41, 43, 450; 558/156, 88, 159, 161, 167, 168, 177, 180, 192; 548/459, 471; 260/DIG. 24

[56] References Cited

U.S. PATENT DOCUMENTS

| | | | |
|---|---|---|---|
| 3,548,038 | 12/1970 | Beck | 252/609 |
| 3,906,061 | 9/1975 | Boyer | 558/159 |
| 3,997,449 | 12/1976 | Wilkinson | 252/609 |
| 4,202,779 | 5/1980 | Smith et al. | 252/609 |
| 4,273,881 | 6/1981 | Otten | 521/108 |
| 4,334,031 | 6/1982 | Otten et al. | 521/131 |
| 4,454,255 | 6/1984 | Ramlow et al. | 525/41 |
| 4,458,038 | 7/1984 | Ramlow et al. | 525/41 |
| 4,564,468 | 1/1986 | Barda | 252/609 |
| 4,565,833 | 1/1986 | Buszard et al. | 252/609 |

*Primary Examiner*—Stephen J. Lechert, Jr.
*Assistant Examiner*—Howard J. Locker
*Attorney, Agent, or Firm*—Kirkland & Ellis

[57] ABSTRACT

Disclosed are a reactive fire-protective formulation containing halogen and phosphorous compounds for polyurethane rigid foam materials and a process for the preparation thereof. The formulation consists of a liquid homogeneous mixture of a polyether-polyol based on an aromatic amine or sorbitol or tetrol or a mixture thereof, a neopentane containing bromo and hydroxy groups and a compound containing phosphorus and nitrogen and is particularly suitable for the preparation of preformulated polyurethane systems (component A).

7 Claims, No Drawings

REACTIVE FIRE-PROTECTIVE FORMULATION FOR RENDERING POLYURETHANE RIGID FOAM MATERIALS FLAME-RESISTANT AND PROCESS FOR PREPARING SAME

The present invention relates to a reactive fire-protective formulation containing halogen and phosphorus compounds for polyurethane rigid foam materials and a process for the preparation thereof.

BACKGROUND OF THE INVENTION

Polyurethane rigid foam materials are used as insulating materials in the construction sector, more specifically in the construction of high-rise buildings and cold-storage houses, and in transportation. However, polyurethane rigid foam materials are combustible because of their chemical composition, and the use thereof for many purposes is thus limited or even becomes impossible.

For reducing the flammability of polyurethane rigid foam materials there are generally employed additive fire-protecting agents based on halogen/phosphorus compounds so that the flammability standard test of DIN 4102/B2, normally flammable, will be fulfilled. However, the additive fire-protecting agents known for that purpose such as, for example, tris-chloroethylphosphate or trisdichloropropylphosphate, have very disadvantageous properties. Upon thermal load they tend to migrate out of the polyurethane rigid foam materials so that no permanent fire-protection is provided. Also, when used, they may be hydrolytically decomposed by moisture, in which reactions corrosive decomposition products may be formed. In addition, the use of additive fire-protecting agents in part results in a significant deterioration of the mechanical properties of the polyurethane foam materials admixed therewith.

It has been known, for example, from Kirk-Othmer, Encyclopedia of Chemical Technology, 3rd edition, volume 10, 1980, page 391, to employ reactive halogen compounds, such as, e.g., dibromoneopentylglycol or halogenated dialcohols in combination with additive phosphorus compounds. However, there is a drawback inherent to the use of such combinations in that the non-reactive portion will migrate and the halogen compounds will not remain dissolved in the polyol component. Said combinations are not storage stable and, therefore, not usable for pre-formulated systems.

Thus, it is the primary object of the present invention to provide a fire-protective formulation for polyurethane rigid foam materials, which formulation reacts with the foam components, is soluble in the polyol component (generally designated as the component A) and will remain permanently stable so that the drawbacks as mentioned above do not occur.

SUMMARY OF THE INVENTION

In accordance with the present invention, the foregoing and other objects, advantages and features may be achieved with a reactive fire-protective formulation for rigid polyurethane foam materials comprising a homogeneous liquid mixture of the following three components:

1. a polyether-polyol based on an aromatic amine, or sorbitol, or tetrol, or mixtures thereof;
2. a neo-pentane compound containing bromine and hydroxy groups; and
3. the reaction product of diethanol amine and dimethyl methane phosphonate.

In its method aspect, the present invention includes a process for preparing such formulations by the steps of:
1. heating the polyether-polyol to a temperature of about 120°–140° C. to form a molten reaction medium;
2. thereafter, adding the neopentane compound and the reaction product to the reaction medium with agitation while maintaining the temperature of the medium at about 120°–140° C.; and
3. thereafter, continuing agitation for a further period of time.

DETAILED DESCRIPTION

The present invention relates to a reactive halogen and phosphorus-containing fire-protective formulation for rigid polyurethane foam materials. The fire-protective formulation is a homogeneous liquid mixture of a polyetherpolyol based on an aromatic amine, or sorbitol, or tetrol, or a mixture thereof (Component 1); a neopentane compound containing bromine and hydroxyl groups (Component 2); and a compound containing phosphorus and nitrogen (Component 3). Such a fire-protective formulation is completely miscible with the polyol component employed in forming polyurethane rigid foams.

As the amine-based polyether polyol there may be used any commercially available product such as Pluranol RX600 by the firm of Pur-Chemie or Lupranol 3402 of BASF. As the sorbitol- or tetrol-based polyetherpolyol there may be used commercially available products such as Lupranol 3421 and Lupranol 3541. As the neopentane containing bromo and hydroxy groups there is preferably used dibromoneopentylglycol or a mixture comprising 2-bromomethyl-2-hydroxymethyl-propanediol-1,3, 2,2-bis-(bromomethyl)-propanediol-1,3 and 3-bromo-2,2-bis-(bromomethyl)-propanol-1. In general, such a mixture consists of from 1 to 20%, and preferably 5%, of 2-bromomethyl-2-hydroxymethyl-propanediol-1,3, from 60 to 85%, and preferably 80%, of 2,2-bis-(bromomethyl)-propanediol-1,3, and from 10 to 20%, and preferably 15%, of 3-bromo-2,2-bis-(bromomethyl)-propanol-1. The compound containing phosphorus and nitrogen preferably is the reaction product of equimolar amounts of diethanolamine and dimethyl methane phosphonate. Other compounds with sufficiently reactive hydroxyl groups can also be employed.

The fire-protective formulation according to the invention as used for rendering polyurethane foam materials flame-resistant advantageously consists of:

30 to 40% by weight of the polyether-polyol based on an aromatic amine, or sorbitol, or tetrol, or a mixture thereof (component 1);

55 to 65% by weight of dibromoneopentylglycol or a mixture comprising 2-bromomethyl-2-hydroxymethyl-propanediol-1,3, 2, 2-bis-(bromomethyl)-propanediol-1,3 and 3-bromo-2,2-bis-(bromomethyl)-propanol-1 (component 2); and 8 to 12% by weight of the compound containing phosphorus and nitrogen prepared from equimolar amounts of diethanolamine and dimethyl methanephosphonate (component 3).

The fire-protective formulation according to the invention is a homogeneous liquid material in which, even after storage for an extended period of time such as 4 months, no crystallization is observed. Upon using a polyether-polyol based on an amine, even after one year no crystallization is observed. The fire-protective formulation is in any ratio miscible with the polyol component for foam polymers (generally designated as component A).

The formulation preferably is prepared by heating a commercially available polyether-polyol based on an aromatic amine such as Pluranol RX600 (component 1) in heatable mixing vessel equipped with a stirrer at 120° C. to 140° C., first adding the component 2 in the molten state at 100° C. to 120° C. and then charging the component 3 while maintaining the mixing temperature at 120° C. to 140° C. After the addition of all of the compounds is completed, said mixing temperature has to be maintained with continuous stirring for another 30 to 45 minutes.

The fire-protective formulation according to the invention is particularly suitable for the preparation of preformulated polyurethane systems (component A) for polyurethane rigid foam materials.

The preparation of the formulations according to the invention is further illustrated by the following examples.

EXAMPLE 1

In a reactor equipped with a stirrer and a thermometer 338 g of the polyol Pluranol RX600 are heated at a temperature of 120° C., and 580 g of dibromoneopentylglycol are added in the molten state at a temperature of from 120° C. to 130° C. with stirring within 5 minutes. Then 82 g of the liquid compound containing phosphorus and nitrogen, as obtained by the reaction of 105 g of diethanolamine (1 mole) and 124 g of dimethyl methanephosphonate (1 mole) at a temperature of 95° C. to 100° C. in the course of 60 minutes. The resulting mixture is stirred at 120° C. to 140° C. for 30 minutes. After cooling to room temperature, 1000 g of a liquid homogeneous mixture having the following characteristic data are obtained:
Bromine content: 35%
Phosphorus content: 1.1%
Hydroxyl value: 434
Viscosity at 20° C.: 20,000 to 25,000 mPa.s
Density at 20° C.: 1.45 g/cm$^3$

EXAMPLE 2

By the procedure of Example 1, 297 g of the polyol Pluranol RX600 are heated at a temperature of 120° C., and 607 g of a technical grade mixture consisting of 2-bromomethyl-2-hydroxymethyl-propanediol-1, 3, 2,2-bis-(bromomethyl)-propanediol-1,3 and 3-bromo-2,2-bis-(bromomethyl)-propanol-1 are added in the molten state at a temperature of from 120° C. to 130° C. with stirring within 5 minutes. The ratio of the components in the mixture is 5:80:15. Then, 96 g of the liquid compound containing phosphorus and nitrogen as in Example 1 are added. The mixture is kept at 120° C. to 140° C. and stirred for 45 minutes. After cooling to room temperature, 1000 g of a liquid homogeneous mixture having the following characteristic data are obtained:
Bromine contents: 37.5%
Phosphorus contents: 1.3%
Hydroxyl value: 440
Viscosity at 20° C.: 20,000 to 23,000 mPa.s
Density at 20° C.: 1.47 g/cm$^3$ The fire behavior and the physical properties of polyurethane rigid foam materials as prepared using the reactive fire-protective formulations according to the Examples 1 and 2 are summarized in the following table.

The formulation I as set forth in the table is a blank sample containing no fire-protective agent.

The designations of the feed materials hereinbelow are as follows:
Stabilizer DC 190=Dow-Corning 190
Catalyst PP=Desmorapid (BAYER)
Caltron 11=Fluorochlorohydrocarbon
Isocyanate (MDI)=Diphenylmethane-4,4'-diisocyanate.
Amine-Based polyether polyol=Pluranol RX600 (Pur-Chemie) or Lupranol 3402 (BASF).
Sorbitol-tetrol-based polyol=Mixture of Lupranol 3421 and Lupranol 3541.

TABLE 1

| Formulation | I | II | III | IV | V |
|---|---|---|---|---|---|
| Feed materials/parts by weight | | | | | |
| Amine-based polyether-polyol | — | — | — | 60 | 60 |
| Sorbitol-tetrol-based polyether-polyol | 100 | 55 | 55 | — | — |
| Formulation of Example 1 | — | 45 | — | 40 | — |
| Formulation of Example 2 | — | — | 45 | — | 40 |
| Stabilizer DC 190 | 1.5 | 1.5 | 1.5 | 1.5 | 1.5 |
| Catalyst PP | 2.0 | 2.0 | 2.0 | 1.5 | 1.5 |
| Caltron 11 | 47 | 47 | 47 | 47 | 47 |
| Isocyanate (MDI) | 140 | 122 | 122 | 120 | 122 |
| Bulk density/kg/m$^3$ | 30–32 | 30–32 | 30–32 | 30–32 | 30–32 |
| Resistance to compression/N/cm$^2$ at 10% compression | | | | | |
| in the foaming direction | 14 | 14 | 14 | 15 | 15 |
| transversely to foaming direction | 8 | 7.5 | 7 | 7.5 | 8 |
| Fire test | | | | | |
| according to DIN 4102 | B3 | B2 | B2 | B2 | B2 |
| according to DIN 4102 after 100 h storage, 80° C. | B3 | B2 | B2 | B2 | B2 |
| according to DIN 4102 after 100 h storage, H$_2$O, 50° C. | B3 | B2 | B2 | B2 | B2 |
| Weight loss/% | | | | | |
| after 100 h storage, 80° C. | 0.03 | 0.02 | 0.01 | 0.015 | 0.015 |
| after 100 h storage, H$_2$O, 50° C. | 0.03 | 0.05 | 0.05 | 0.06 | 0.08 |

What is claimed is:

1. A reactive fire-protective formulation for rigid polyurethane foam materials comprising a homogeneous liquid mixture of:
   a polyether-polyol based on an aromatic amine, or sorbitol, or tetrol, or mixtures thereof;
   a neopentane compound containing bromine and hydroxy groups; and
   a reaction product of diethanol amine and dimethyl methane phosphonate.

2. A reactive fire-protective formulation for rigid polyurethane foam materials comprising a homogeneous mixture of:
   about 30 to 40 percent by weight of polyether-polyol based on an aromatic amine, or sorbitol, or tetrol, or a mixture thereof;
   about 55 to 65 percent by weight of a neopentane compound containing bromine and hydroxy groups; and
   about 8 to 12 percent by weight of a reaction product of equimolar amounts of diethanol amine and dimethyl methanephosphonate.

3. A formulation, as claimed in claim 2, wherein the neopentane compound is dibromoneopentyl glycol or a mixture of 2-bromomethyl-2-hydroxymethyl-propanediol-1,3; 2,2-bis-(bromomethyl)-propanediol 1,3; and 3-bromo-2,2-bis-(bromomethyl)-propanol-1.

4. A formulation, as claimed in claim 3, wherein the mixture comprises:
   about 1-20 percent 2-bromomethyl-2-hydroxymethyl-propane diol-1,3,;
   about 60 to 85 percent 2,2-bis-(bromomethyl)-propane diol-1,3; and
   about 10 to 20% 3-bromo-2,2-bis-(bromomethyl)-propanol-1, all by weight of the mixture.

5. A formulation, as claimed in claim 2, wherein the reaction product is formed from substantially equimolar amounts of diethanol amine and dimethyl methane phosphonate.

6. A process for preparing the formulation of any of claims 1 to 5 comprising the steps of:
   heating the polyether-polyol based on an aromatic amine or sorbitol or tetrol or mixtures to a temperature of about 120°-140° C. to form a molten reaction medium;
   thereafter adding the neopentane compound and the reaction product to the reaction medium with agitation while maintaining the temperature of resulting formulation at about 120°-140° C.; and
   thereafter continuing agitation for a further period of time.

7. A process, as claimed in claim 6, wherein the period of time is at least about 30 minutes.

* * * * *

UNITED STATES PATENT AND TRADEMARK OFFICE
CERTIFICATE OF CORRECTION

PATENT NO. : 4,717,509

DATED : January 5, 1988

INVENTOR(S) : Walter Buttgens et al

It is certified that error appears in the above—identified patent and that said Letters Patent is hereby corrected as shown below:

Column 3, line 35, "60 minutes" should be --60 minutes, are added--

Signed and Sealed this

Fifth Day of July, 1988

Attest:

DONALD J. QUIGG

*Attesting Officer*   *Commissioner of Patents and Trademarks*